United States Patent
Choi et al.

[11] Patent Number: 6,064,029
[45] Date of Patent: May 16, 2000

[54] APPARATUS FOR CONTROLLING THE QUALITY OF A RESISTANCE SPOT WELD AND METHOD THEREFOR

[75] Inventors: Jae-Sung Choi, Seoul; Kyung-Il Kim, Kangwon-Do; Won-Ho Sung, Seoul, all of Rep. of Korea

[73] Assignee: Institute for Advanced Engineering, Seoul, Rep. of Korea

[21] Appl. No.: 09/090,088

[22] Filed: Jun. 4, 1998

[30] Foreign Application Priority Data

Jun. 4, 1997 [KR] Rep. of Korea ........................ 97-23022
Dec. 30, 1997 [KR] Rep. of Korea ........................ 97-78412

[51] Int. Cl.[7] .................................................. B23K 11/24
[52] U.S. Cl. ............................................................ 219/110
[58] Field of Search .................................... 219/110, 108, 219/109

[56] References Cited

U.S. PATENT DOCUMENTS

| | | | |
|---|---|---|---|
| 4,001,540 | 1/1977 | Drake et al. | 219/110 |
| 4,254,466 | 3/1981 | Jurek | 219/110 |
| 4,459,457 | 7/1984 | Jurek | 219/110 |
| 5,852,273 | 12/1998 | Ryudo et al. | 219/110 |

*Primary Examiner*—Clifford C. Shaw
*Attorney, Agent, or Firm*—Jacobson, Price, Holman & Stern, PLLC

[57] ABSTRACT

A resistance spot welding apparatus having a primary circuit, a secondary circuit and a transformer for controlling the quality of a resistance spot weld, wherein a voltage is applied to the primary circuit to thereby generating a welding current, includes a current sensor for sensing the weld current from the primary circuit, a power factor calculator, a dynamic resistance calculator, a nugget estimator and a weld current controller. In the welding apparatus, the power factor calculator calculates power factors based on the welding current. And, the nugget estimator estimates a nugget size and nugget penetration from an dynamic resistance curve by using a Hidden Markov Model method, wherein the dynamic resistance curve is obtained by the power factor calculator. The quality of the resistance spot weld is controlled by changing the welding current based on the nugget size and the nugget penetration.

8 Claims, 6 Drawing Sheets

ID OF THE INVENTION

The present invention relates to an apparatus and method for controlling the quality of resistance spot welding; and, more particularly, to a resistance spot welding apparatus and method for controlling the welding quality by utilizing a dynamic resistance curve.

DESCRIPTION OF THE PRIOR ART

Recently, the resistance spot welding is widely used in various applications, e.g., for joining a pair of metal sheets used in the manufacture of automobiles. As is well known, the quality control during the welding process is one of the main difficulties associated with the resistance spot weld.

In FIG. 1, there is shown a prior art resistance spot welding apparatus 100 capable of predicting and controlling the quality of the resistance spot weld, as disclosed in U.S. Pat. No. 4,493,965, entitled "METHOD AND APPARATUS FOR PREDICTING AND CONTROLLING THE QUALITY OF A RESISTANCE SPOT WELD". The resistance spot welding apparatus 100 comprises a spot welder 110 provided with a pair of welding electrodes, a pair of metal sheets 112, a transformer 114, a controller 116, a current sensor 120, a voltage sensor 122 and a microprocessor 130.

In the resistance spot welding apparatus 100, the controller 116 coupled to the transformer 114 supplies a welding current and voltage to the metal sheets 112 to be welded. The current and voltage sensors 120, 122 produce analog signals proportional to the weld current and voltage, respectively. It is preferred that leads of the voltage sensor 122 be placed as close to the welding electrodes as possible to eliminate the influence of the distributed resistance in the gun arm of the spot welder 110 during the measurement of the weld voltage. The current sensor 120 may be placed anywhere in the circuit of the resistance spot welding apparatus 100. The microprocessor 130 generates a gate signal for controlling the welding current, wherein the gate signal is obtained by using the current and the voltage detected from the current and the voltage sensors 120, 122. The controller 116 controls the welding current being applied to the primary circuit of the resistance spot welder 100 in response to the gate signal from the microprocessor 130.

One of the major shortcomings of the above-described resistance spot welding apparatus 100 is that it requires the current and the voltage sensors 120, 122 be incorporated therein for detecting the welding current and voltage, respectively, thereby making the resistance spot welding apparatus 100 complicated.

Further, the above prior art device tends to damage the connections between the leads of the voltage sensor 122 and the welding electrodes since the connections are made by mechanically attaching or positioning the voltage sensor 122 and its respective leads in direct contact with the welding electrodes or in close proximity thereto.

SUMMARY OF THE INVENTION

It is, therefore, a primary object of the present invention to provide a resistance spot welding apparatus having a simple structure by using a dynamic resistance curve therefor so as to reduce the number of sensors needed.

Another object of the present invention is to provide an improved method capable of accurately estimating the quality of a spot weld by using a nugget size and a nugget penetration of the resistance spot weld which are estimated by using HMM (Hidden Markov Model) method.

In accordance with the present invention, there is provided a resistance spot welding apparatus having a primary circuit, a secondary circuit and a transformer for controlling the quality of a resistance spot weld, wherein a voltage is applied to the primary circuit to thereby generate a welding current, the welding apparatus comprising: a current sensor for sensing the weld current from the primary circuit; a power factor calculator for calculating power factors based on the welding current; a dynamic resistance calculator for obtaining a dynamic resistance curve based on the calculated power factors; a nugget estimator for estimating a nugget size and a nugget penetration from the dynamic resistance curve by using the Hidden Markov Model (HMM) method; and a weld current controller for controlling the weld current by using the nugget size and the nugget penetration.

BRIEF DESCRIPTION OF THE DRAWINGS

The present invention together with the above and other objects and advantages will become apparent from the following description of preferred embodiments, when read in conjunction with the accompanying drawings, wherein.

DETAILED DESCRIPTION OF THE PREFERRED EMBODIMENTS

There are illustrated in FIGS. 2 to 7 various views of an inventive resistance spot welding apparatus 200 and method therefor in accordance with preferred embodiments of the present invention.

Figure 1:
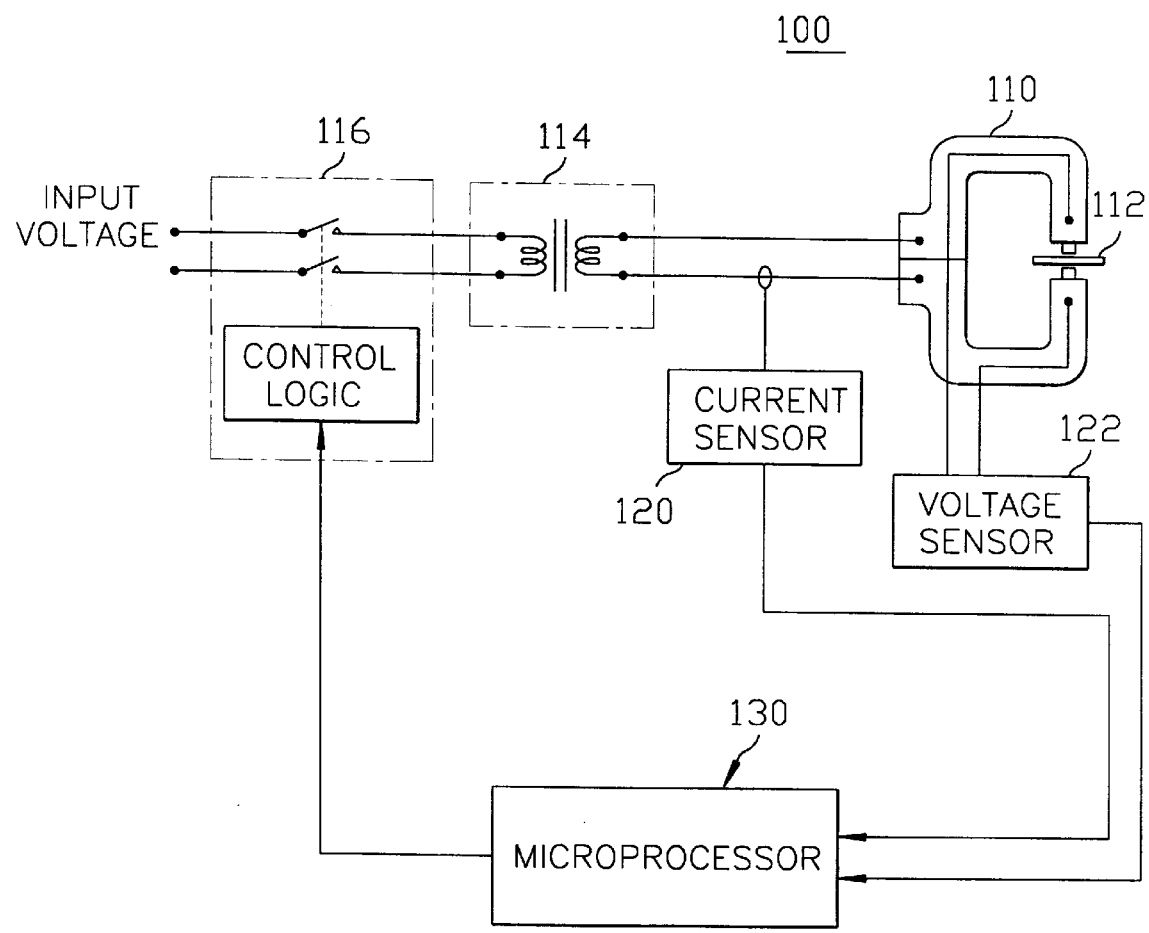
FIG. 1 represents a diagram of a prior art resistance spot welding apparatus.
Figure 2:
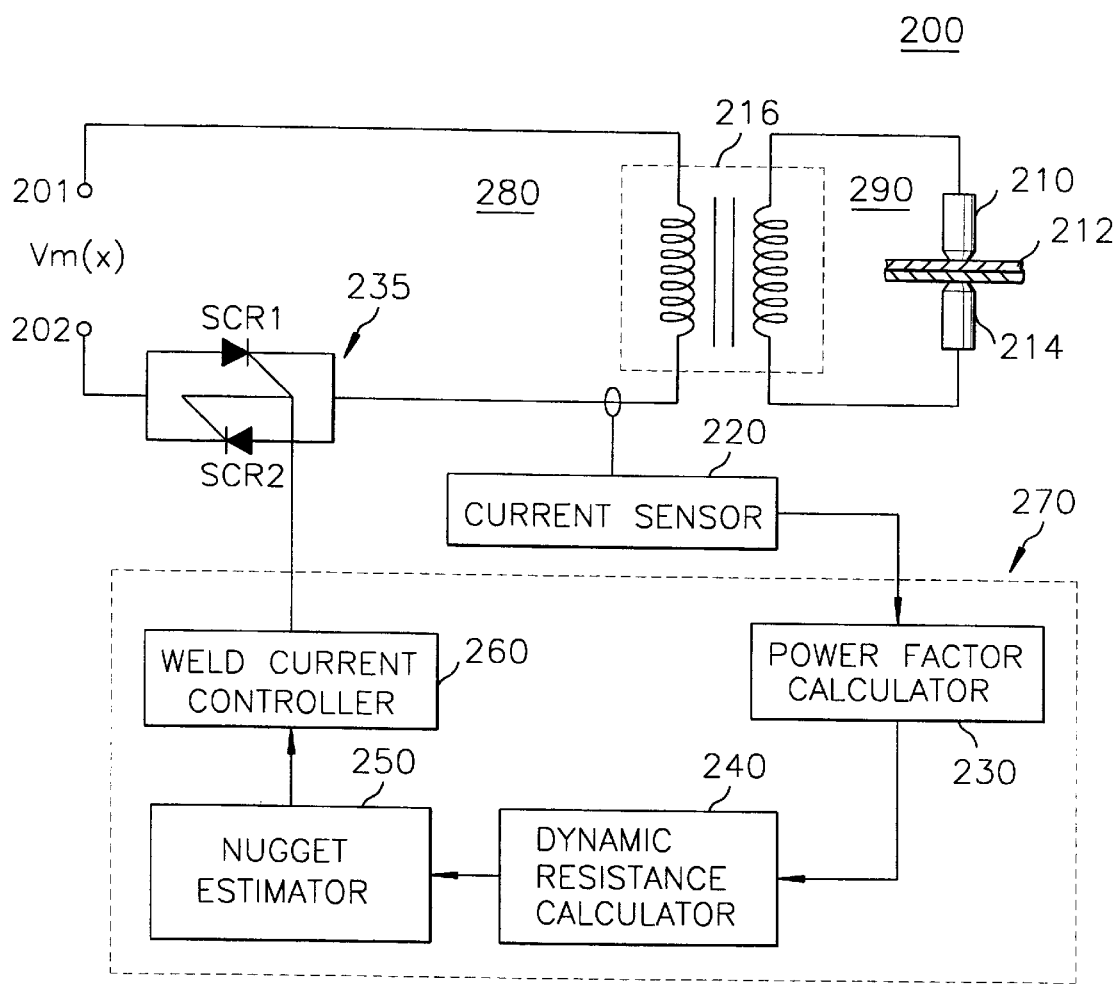
FIG. 2 illustrates a diagram of a resistance spot welding apparatus incorporating therein a welding quality controller in accordance with the present invention.

There is illustrated in FIG. 2 a schematic block diagram of the resistance spot welding apparatus 200 incorporating therein a welding quality controller 270 in accordance with the present invention, wherein the welding quality controller 270 includes a power factor calculator 230, a dynamic resistance calculator 240, a nugget estimator 250 and a weld current controller 260. The resistance spot welding apparatus 200 comprises a transformer 216 provided with a primary coil, an iron core and a secondary coil, a primary circuit 280 including the primary coil of the transformer 216 and an SCR (semiconductor-controlled rectifier) block 235 provided with a first SCR (SCR1) and a second SCR (SCR2), a secondary circuit 290 including a pair of electrodes 210, 214, a pair of metal sheets 212 clamped between the electrodes 210, 214 and the secondary coil of the transformer 216, and a current sensor 220.

In the welding apparatus 200, an AC (alternating current) input voltage Vm(x) on lines 201, 202 is applied between one end of the SCR block 235 and one end of the primary coil of the transformer 216, thereby letting a primary current flow through the SCR block 235 and the primary coil of the transformer 216. The AC input voltage is typically 220 volts, 380 volts or 440 volts. The transformer 216 transfers the electrical energy of the primary circuit 280 to the secondary circuit 290 with changes in voltage and current for making the current of the secondary circuit 290 be higher than that of the primary circuit 280. In the resistance spot welding, the pair of electrodes 210, 214 clamps the metal sheets 212 and passes the secondary current through a local area of the metal sheets 212 to heat the local area of the metal sheets 212. Therefore, if the resistance spot welding is ended, a nugget, i.e., welded spot, is formed between the local area of the metal sheets 212. It should be noted that the nugget size 67, i.e., the diameter of the welded spot, and the nugget penetration ρ, i.e., the depth of the welded spot, represent the quality of the resistance spot weld. The SCR block 235 is used to control the welding current delivered to the primary coil of the transformer 216. The current sensor 220 is connected to the primary circuit 280 for detecting the welding current during the operation of the resistance spot welding apparatus 200.

Figure 3:
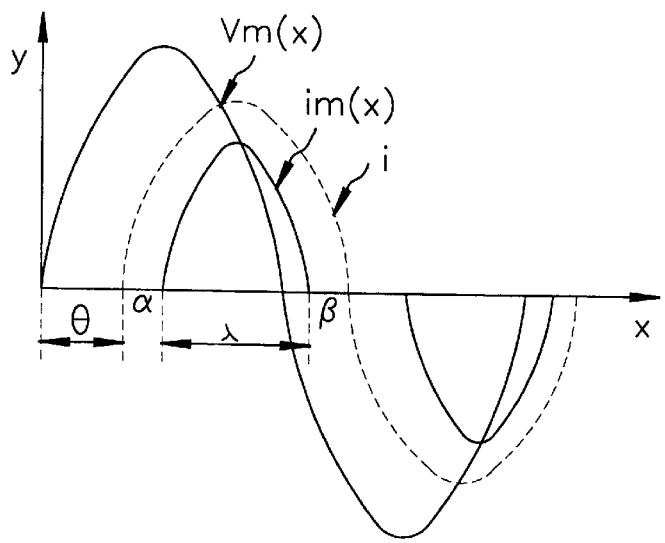
FIG. 3 shows a graph illustrating the variation in a welding current im(x) as a function of a phase angle and its amplitude according to an input voltage Vm(x)

In FIG. 3, there is shown a graph illustrating the variation of a welding current im(x) measured at the primary circuit 280 by the current sensor 220 as a function of the phase angle for a given input voltage Vm(x), wherein the x-axis represents a phase angle; the y-axis, magnitudes of im(x) and Vm(x); α, a firing angle being defined by a point at which the welding current starts in a half cycle; β, an extinction angle at which the current im(x) fades away in a half cycle; and λ, a conduction angle being defined by difference between α and β during one half cycle. A full heated current i is represented by a dotted line in FIG. 3, and Θ is a power factor representing a phase delay of the full heated current i with respect to the input voltage Vm(x). In the preferred embodiment of the present invention, the Vm(x) for one welding period, i.e., a period for welding one spot, includes M number of half cycles and the im(x) for one welding period also includes the same number of half cycles as that of the Vm(x). The welding current im(x) can be represented from the following equation:

$$im(x)=(Vm/|Z|)(\sin(x-\Theta)-\sin(\alpha-\Theta)e^{-(x-\alpha)/\tan\Theta}) \quad \text{Eq. 1}$$

wherein, Z represents an impedance of the resistance spot welding apparatus 200.

In Eq. 1, by assuming x is equal to β, the im(x) becomes zero. Therefore, Eq. 1 can be rewritten as:

$$\sin(\beta-\Theta)-\sin(\alpha-\Theta)\exp^{-(\beta-\alpha)/\tan\Theta}=0. \quad \text{Eq. 2}$$

In FIG. 3, since λ is equal to β−α, Eq. 2 is given in Eq. 3:

$$\sin(\alpha+\lambda-\Theta)-\sin(\alpha-\Theta)\exp^{-\lambda/\tan\Theta}=0. \quad \text{Eq. 3}$$

In the preferred embodiment of the present invention, the power factor calculator 230 obtains the α and the λ for each of half cycles from the im(x) provided from the current sensor 220. Therefore, power factors Θm for each of half cycles can be obtained from Eq. 3. The power factor calculator 230 provides Θm to the dynamic resistance calculator 240.

Figure 4:
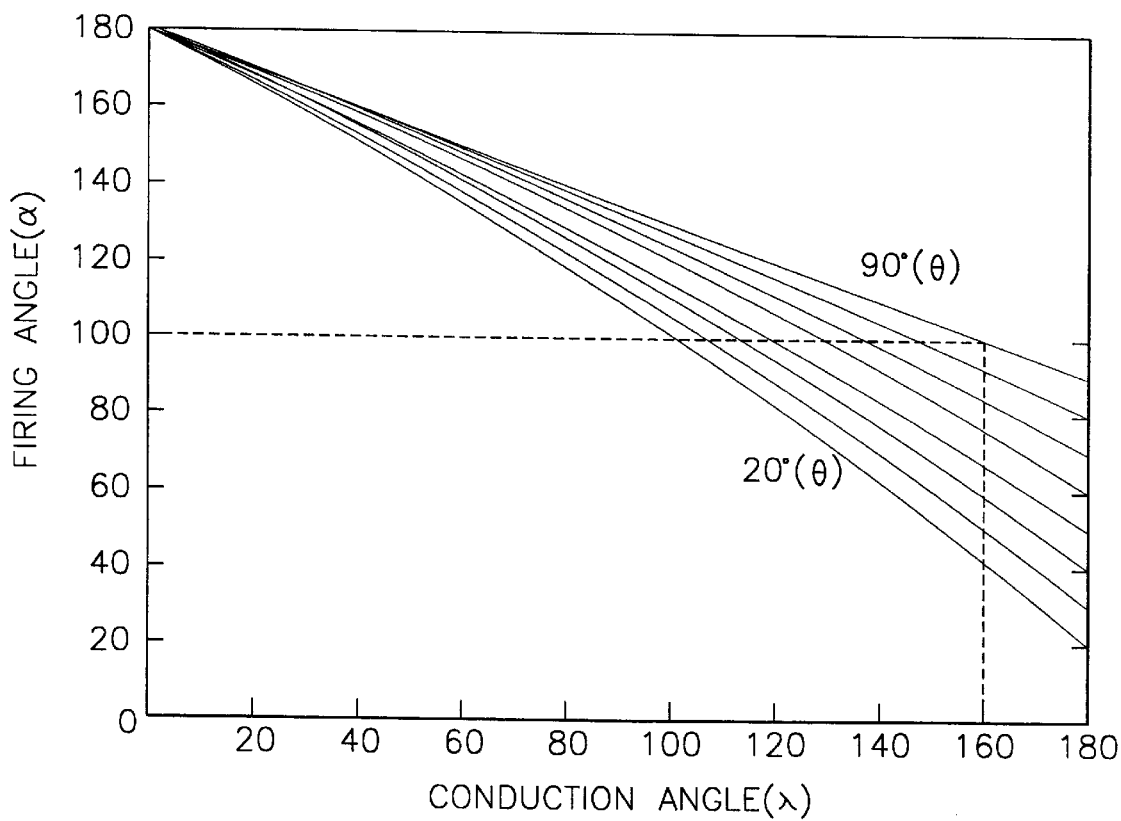
FIG. 4 depicts a graph illustrating power factors in the welding current as a function of a firing angle and a conduction angle.

A simulation result for the Θm obtained from Eq. 3 in accordance with the embodiment of the invention is represented in FIG. 4, wherein Θm's are depicted as a function of λ and α. For example, if λ and α are 160 degrees and 100 degrees, respectively, then Θm is 90 degrees. The example case is represented as a dotted line in FIG. 4.

Referring back to FIG. 2, the dynamic resistance calculator 240 calculates M number of corresponding dynamic resistances Rdm's based on the Θm's from the power factor calculator 230 given by following equation which is well known in the art:

$$Rdm=wL\cot\Theta m \quad \text{Eq. 4}$$

wherein, Rdm is a dynamic resistance of the resistance spot welding apparatus 200; L, an inductance of the resistance spot welding apparatus 200; and w, an angular velocity of the Vm(x). Further, assuming that the thickness of the metal sheets 212 is uniform, the L becomes constant. And also, since the input voltage Vm(x) has a constant angular velocity, the w is constant. Therefore, the dynamic resistance calculator 240 can calculates Rdm's for each of the half cycles from Eq. 4. The calculated Rdm's are supplied to the nugget estimator 250 for estimating a nugget size δ and penetration ρ of the resistance spot weld.

In a preferred embodiment of the invention, the nugget size δ and the nugget penetration ρ are estimated by using conventional Hidden Markov Models (HMM). The HMMs are trainable statistical models with two appearing features: (1) no a prior assumptions are made about the statistical distribution of the data to be analyzed and (2) a high degree of sequential structure can be encoded by the HMMs. The HMMs have been successfully applied for a variety of stochastic signal processing, including a speech recognition, gesture recognition as well as classification of open-loop human action skills and reactive human control strategies. For details of the HMMs, see, e.g., in L. R. Rabiner, "A Tutorial on Hidden Markov Models and Selected Applications in Speech Recognition", *Proceedings of the IEEE*, Vol. 77, No. 2, pps 257–286 (February 1989).

Figure 5:
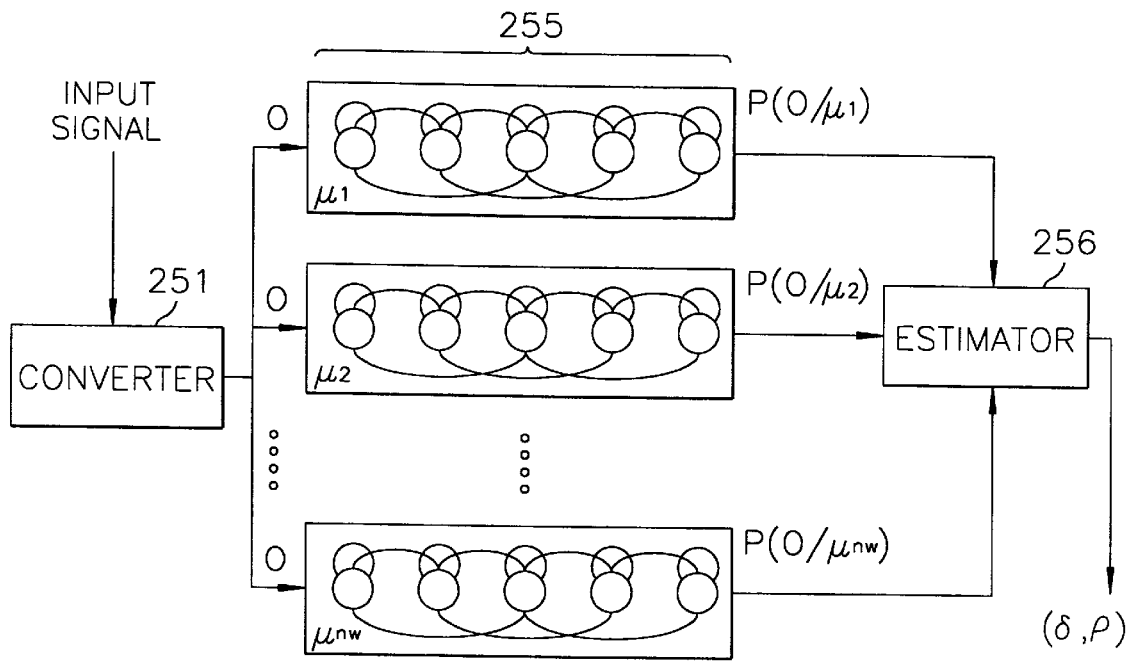
FIG. 5 describes a block diagram of the inventive nugget estimator for estimating a nugget size and a nugget penetration by using the Hidden Markov Model method shown in FIG. 2.

Referring to FIG. 5, there is shown a block diagram for estimating a nugget size δ and a nugget penetration ρ by using the HMM in accordance with the present invention, wherein the nugget estimator 250 includes a converter 251, a HMM (Hidden Markov Model) block 255 and an estimator 256. In the preferred embodiment of the invention, an input signal represents the Rd curve having the Rdm's calculated at the dynamic resistance calculator 240. The input signal is provided to the converter 251.

Figure 6:
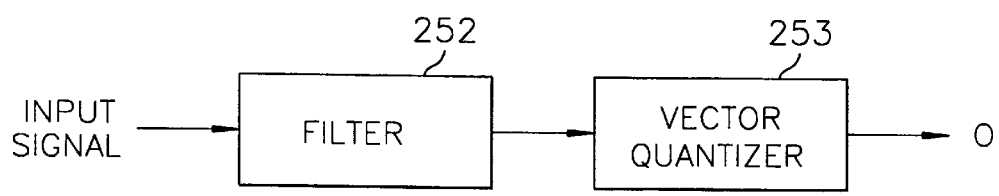
FIG. 6 provides a schematic block diagram of the inventive converter for generating a sequence of discrete observation symbols in preparation for the HMM training shown in FIG. 5.

In FIG. 6, there is shown a block diagram of the converter 251 for generating a discrete observation symbol sequence in preparation for nugget estimation using the HMM block 255 shown in FIG. 5. The discrete observation symbol sequence is represented by symbol "O". The converter 251 contains a filter 252 and a vector quantizer 253. In the filter 252, the input signal is smoothed, thereby generating a filtered input signal. The vector quantizer 253 quantizes the filtered input signal by using a vector quantization (VQ) method, e.g., a conventional LBQ VQ algorithm, to thereby generate the discrete observation symbol sequence "O", wherein the discrete observation symbol sequence "O" is classified into one of nω levels by the vector quantizer 253.

Referring back to FIG. 5, the discrete observation symbol sequence "O" is fed to the HMM block 255. The HMM block 255 contains nω number of groups $\mu_i$'s, wherein $i \in \{1,$ 2, . . . nw}. The HMM $\mu i$ is trained by a set of training observation sequence $\Omega i$. The $\Omega i$ can be as: $\Omega i = \{Oi^{(1)}, Oi^{(2)}, \ldots Oi^{(l)}\}$, wherein $\Omega i^{(k)}$ is the kth training observation sequence in class $\omega i$ and ni is the total number of training observation sequence in class $\omega i$. The discrete observation symbol sequence "O" is processed at each of the $\mu i$'s by using e.g., a left-to-right model for calculating a corresponding probability $P(O/\mu i)$. Each of the probability $P(O/\mu i)$'s is provided to the estimator 256. The estimator 256 selects a maximum value among the $P(O/\mu i)$'s and estimates a nugget size $\delta$ and penetration $\rho$ of the resistance spot weld from the group $\mu n$ having the maximum value. The estimator 256 outputs an estimated $\delta$ and $\rho$ as the nugget size and the nugget penetration of the resistance spot weld.

Referring back to FIG. 2, the weld current controller 260 receives the estimated $\delta$ and $\rho$ from the nugget estimator 250. The weld current controller 260 checks whether the estimated $\delta$ and $\rho$ are smaller or greater than a set of predetermined thresholds TH1 and TH2. The $\delta$ and the $\rho$ are compared with TH1 and TH2, respectively. If both the estimated $\delta$ and $\rho$ are greater than the thresholds TH1 and TH2, the weld current controller 260 generates a gate signal for decreasing a welding current for a next welding period by a preset amount, and if otherwise, it generates a gate signal to the SCR block 235 for increasing a welding current for the next welding period by the preset amount.

Figure 7A:
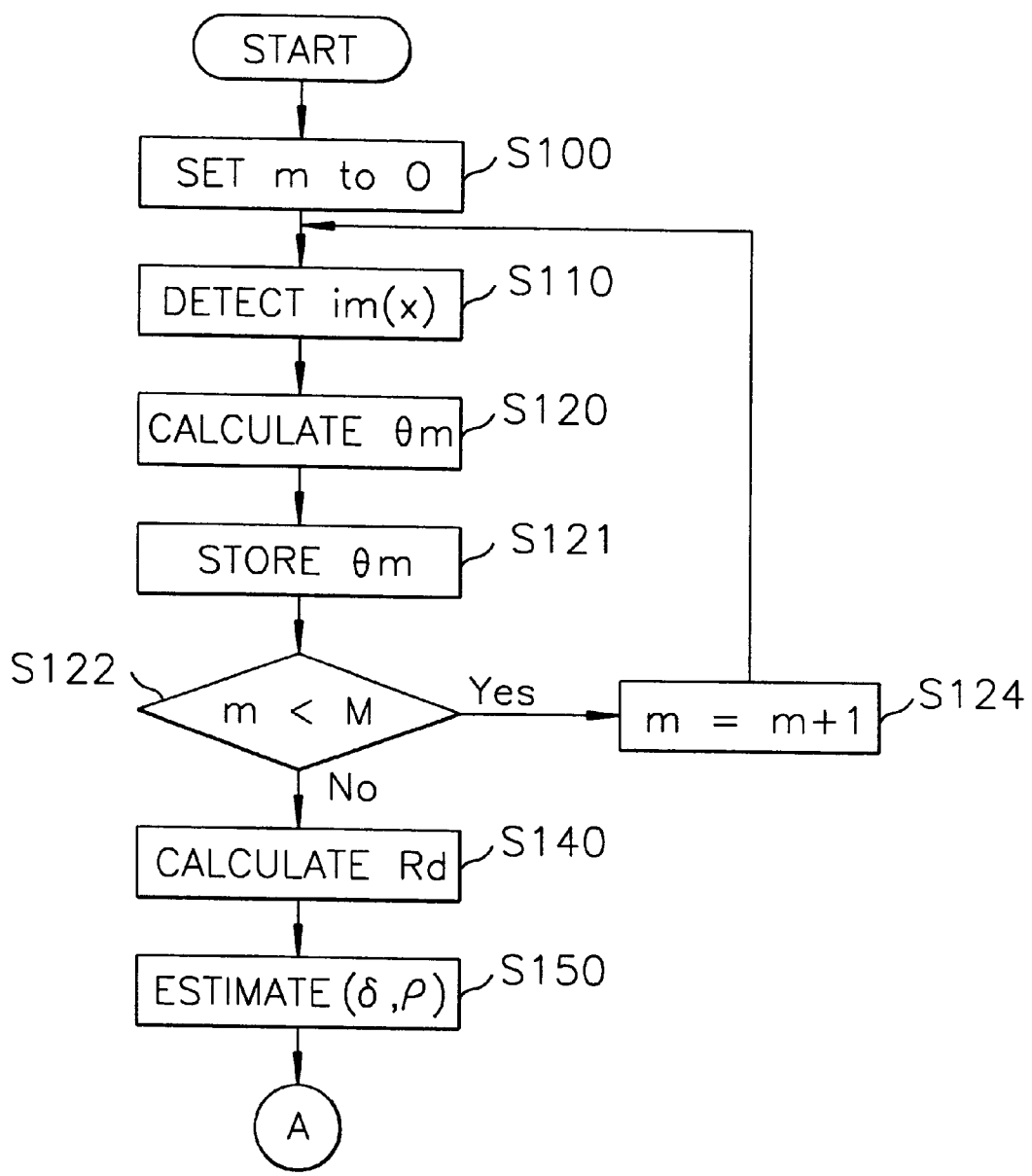
FIGS. 7A and 7B present a flow chart illustrating the procedure for controlling the quality of a resistance spot weld by using the welding quality controller shown in FIG. 2.
Figure 7B:
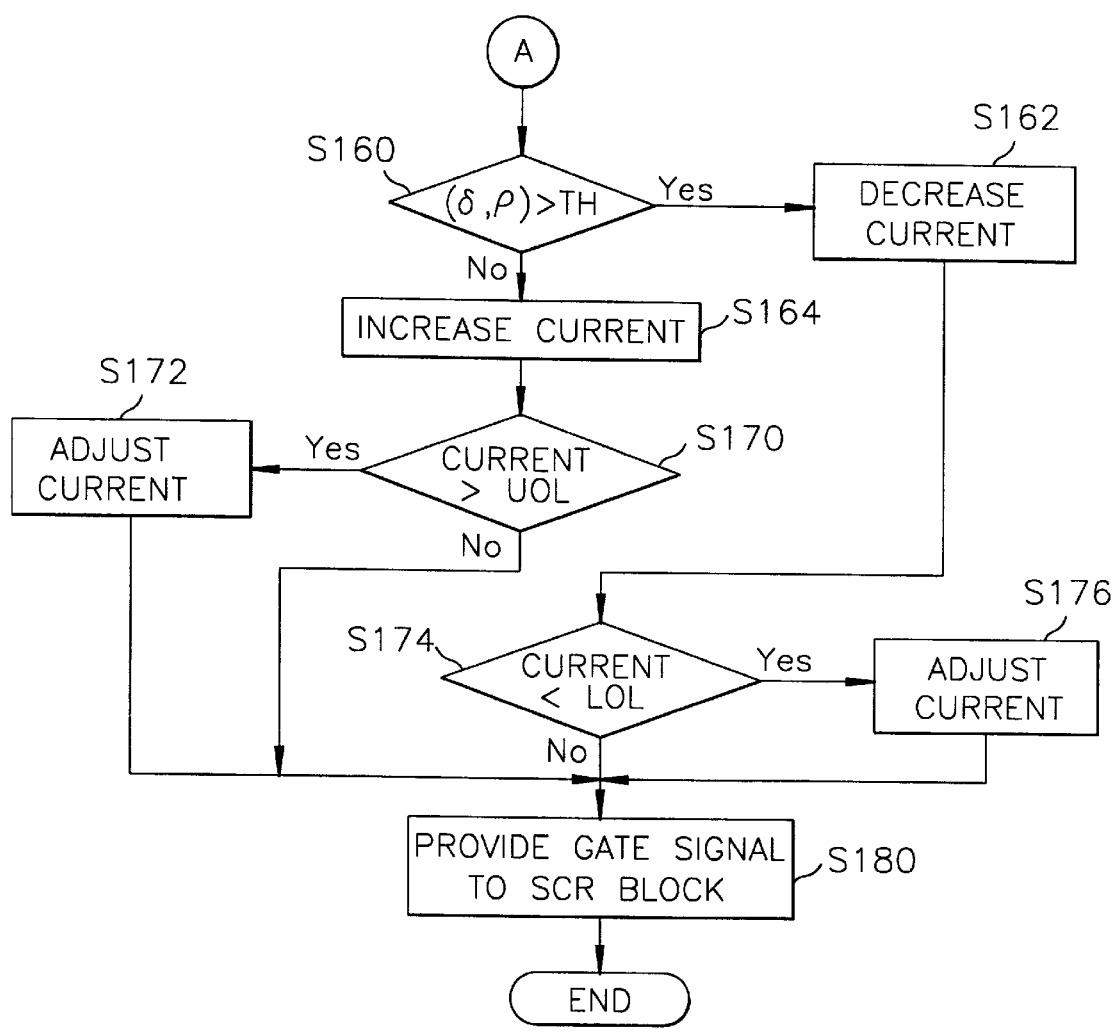

With reference to FIGS. 7A and 7B, the method for controlling the quality of a resistance spot weld in accordance with the present invention will now be described in detail. At step S100, the power factor calculator 230 sets m to 0 and goes to step S110, wherein m, being a positive integer and ranging from 0 to M, represents number of half cycles in the detected im(x). At step S110, the current sensor 220 detects the im(x) in the primary circuit 280 and sends the detected welding current im(x) to the power factor calculator 230, wherein the detected im(x) including M number of half cycles has information on the $\lambda$ and the $\alpha$ for each half cycles. And the process goes to step S120. In a preferred embodiment of the invention, an onset of each half cycle of the input voltage Vm(x) is also detected by the current sensor 220 and provided to the power factor calculator 230. At step S120, the power factor calculator 230 calculates the power factor $\Theta$m by using Eq. 3 or the curves shown in FIG. 4, and goes to step S121 to store the $\Theta$m and then the process processes to step S122.

At step S122, the power factor calculator 230 checks whether m is smaller than M or not, and if the checked result is affirmative, the process goes to step S124. At step S124, the m is increased by one to m+1 and returns to step S110. If the checked result in step S122 is negative, the power factor calculator 230 provides the dynamic resistance calculator 240 with the stored $\Theta$m's and process goes to step S140.

At step S140, the dynamic resistance calculator 240 calculates Rdm for each $\Theta$m by using Eq. 4. The dynamic resistance calculator 240 makes a Rd curve by using the calculated Rdm's and provides the Rd curve to the nugget estimator 250.

At step S150, the nugget estimator 250 estimates a nugget size and a nugget penetration $\delta$ and $\rho$ by using the HMM method, and the process goes to step S160 through a tap A. At step S160, the weld current controller 260 checks whether both the estimated $\delta$ and $\rho$ are larger than a set of predetermined thresholds (TH1, TH2), and if the checked result is Yes, the process goes to step S162 to decrease the welding current by a preset amount for a next welding period and the process goes to step S174. If the checked result is No, the process goes to step S164 to increase the welding current by the preset amount for the next welding period, and the process goes to step S170.

At step S170, the nugget estimator 250 checks whether the increased welding current is larger than an UOL (upper operating limit) of the resistance spot welding apparatus 200 or not, and if the checked result is Yes, the process goes to step S172 to set the welding current to be equal to or smaller than the UOL and the process goes to step S180. If the checked result is No in step S170, the process goes to step S180. At step S174, the weld current controller 260 checks whether the decreased welding current at step S162 is smaller than a LOL (lower operating limit) of the resistance spot welding apparatus 200. If the checked result is Yes, the process goes to step S176 to set the welding current to be equal to or greater than the LOL. And the process goes to step S180. If the checked result at step S174 is No, the process goes to step S180. At step S180, the weld current controller 260 provides the SCR block 235 with a gate signal for controlling a welding current for a next welding period to coincide with the adjusted welding current at step S162, S164, S172 or S176.

While the present invention has been described with respect to the preferred embodiments, other modifications and variations may be made without departing from the spirit and scope of the present invention as set forth in the following claims.

What is claimed is:

1. A resistance spot welding apparatus having a primary circuit, a secondary circuit and a transformer for controlling the quality of a resistance spot weld, wherein an electric voltage is applied to the primary circuit to thereby generate a welding current, the welding apparatus comprising:

means for sensing the weld current from the primary circuit;

means for calculating power factors based on the welding current;

means for obtaining a dynamic resistance curve based on the calculated power factors; and means for generating a gate signal for controlling the weld current wherein the gate signal is obtained by using the dynamic resistance curve, wherein the generating means includes means for estimating a nugget size and a nugget penetration based on the dynamic resistance curve and means for generating the gate signal based on the nugget size and the nugget penetration, and wherein the estimating means includes:

means for converting the dynamic resistance curve to a discrete observation symbol sequence;

a HMM block having n$\omega$ number of groups $\mu i$'s for calculating the discrete observation symbol sequence at each of the groups $\mu i$'s to calculate a corresponding probability $P(O/\mu i)$, wherein $i \in \{1, 2, n\omega\}$ and n$\omega$ is a predetermined positive integer;

means for estimating the nugget size and the nugget penetration by selecting a group having a maximum probability value among the groups $\mu i$'s; and means for outputting the nugget size and the nugget penetration.

2. The welding apparatus of claim 1, further comprising a pair of semiconductor-controlled rectifiers for controlling the weld current.

3. The welding apparatus of claim 1, wherein the converting means includes:

means for filtering the dynamic resistance curve; and a vector quantizer for quantizing the discrete observation to thereby obtain the discrete observation symbol sequence.

4. A method for controlling a weld current for use in a resistance spot welding apparatus, comprising the steps of:
   (a) detecting M number of power factors of a weld current during a welding process including M number of half cycles, wherein each of the power factors corresponds to each of the half cycles, respectively;
   (b) selecting a dynamic resistance curve based on the detected M number of power factors;
   (c) determining a nugget size and a nugget penetration by using the dynamic resistance curve; and
   (d) controlling the weld current based on the nugget size and the nugget penetration,
   wherein the step (c) includes the steps of:
      (c1) converting the dynamic resistance curve to a discrete observation symbol sequence;
      (c2) calculating a plurality of probability for the discrete observation symbol sequence by using HMM (Hidden Markov Model); and
      (c3) estimating the nugget size and the nugget penetration based on a maximum value of the probabilities.

5. The method according to claim 4, further comprising, before said step (a), the step of:
   (a1) detecting a firing angle and a conduction angle for each of the half cycles of the weld current.

6. The method according to claim 5, further comprising, after said step (a1), the step of:
   (a11) calculating the M number of power factors from the firing and the conduction angles for each of the half cycles.

7. The method according to claim 6, wherein the power factors are calculated by following relationship:

$$\sin(\alpha+\lambda-\Theta)-\sin(\alpha-\Theta)\exp^{-\lambda/\tan\Theta}=0$$

wherein $\alpha$ represents the firing angle; $\lambda$, the conduction angle; and $\Theta$, the power factor of the corresponding half cycle of the welding current.

8. The method according to claim 4, wherein the step (c1) includes the steps of:
   (c11) filtering the dynamic resistance curve to thereby obtain a filtered dynamic resistance curve; and
   (c22) vector-quantizing the filtered resistance curve to thereby obtaining the discrete observation symbol sequence.

* * * * *